Patented Jan. 31, 1933

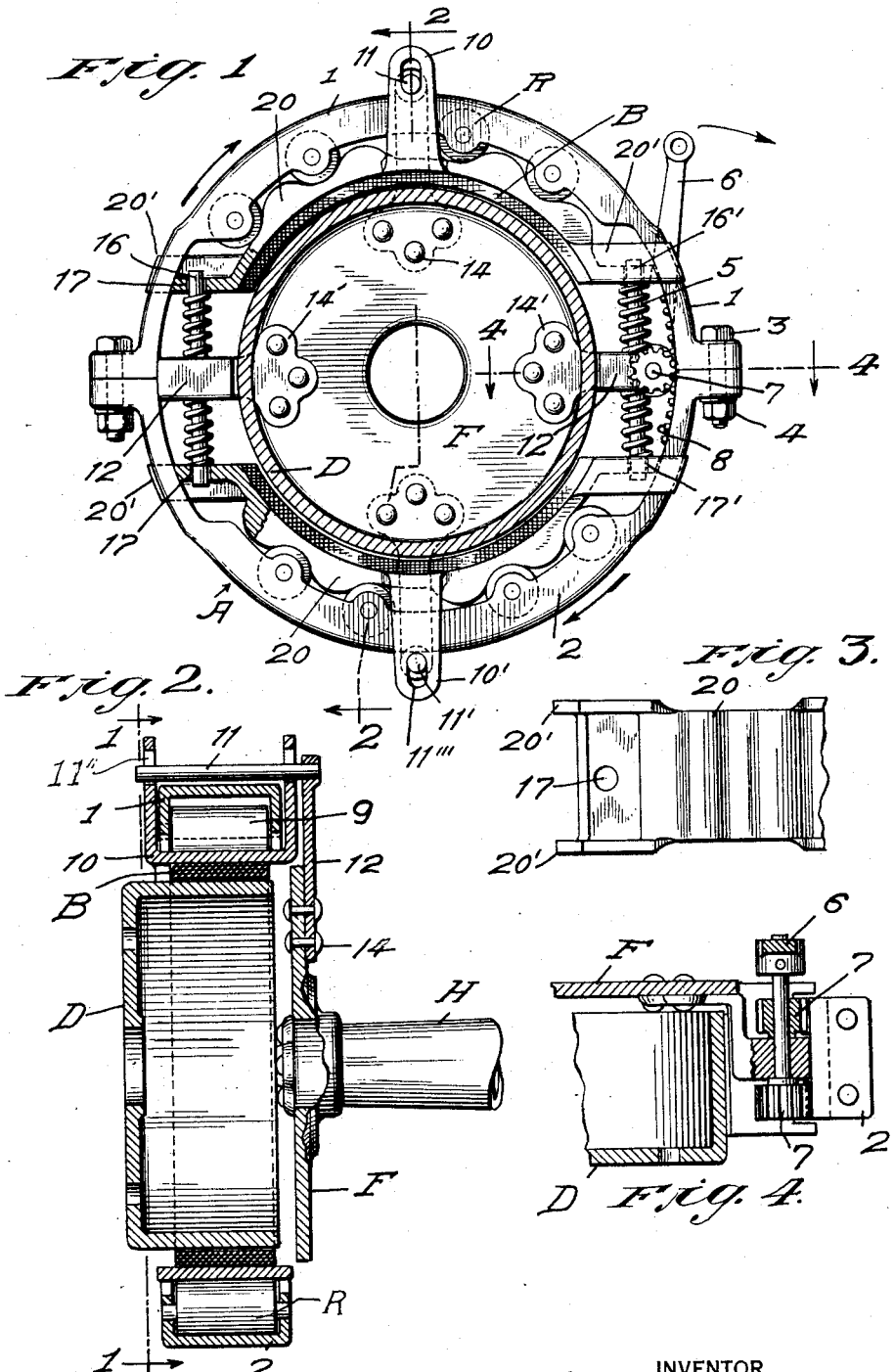

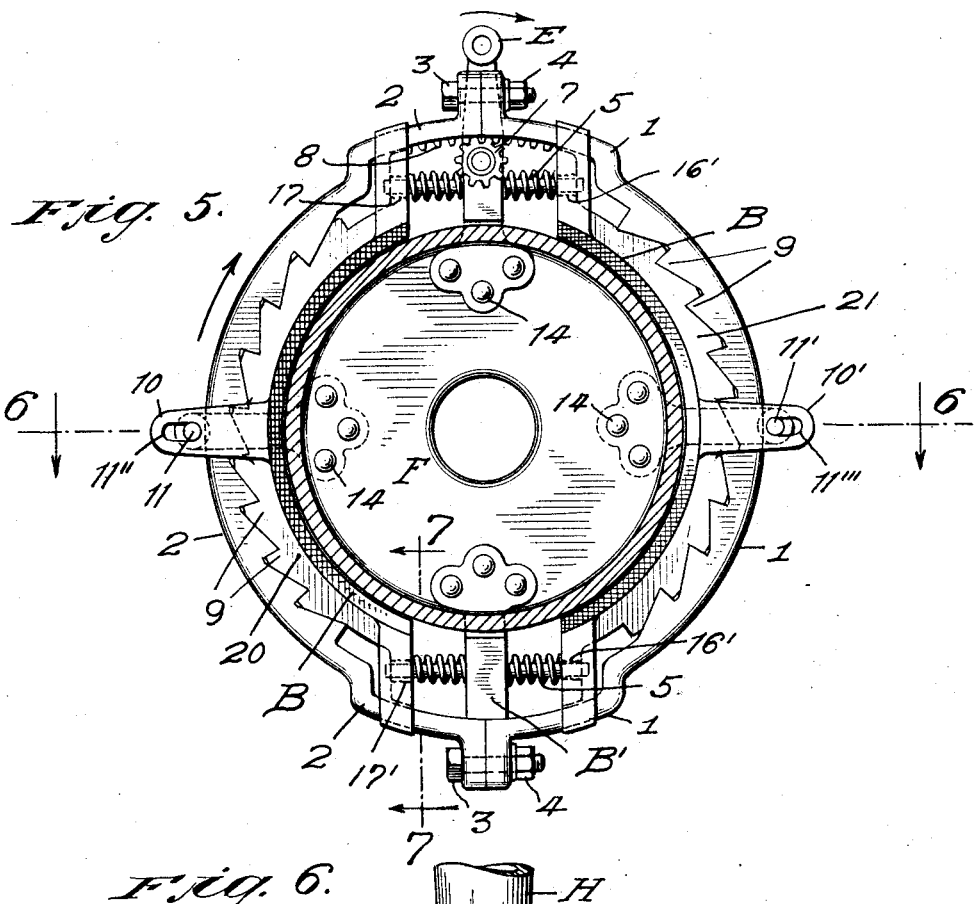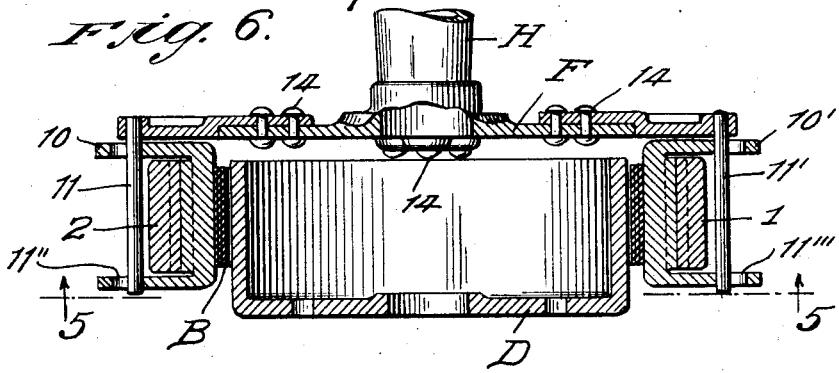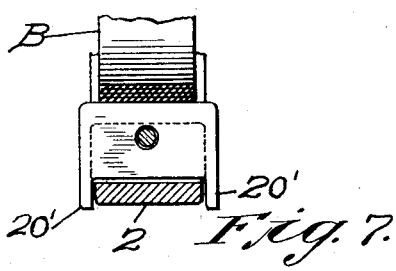

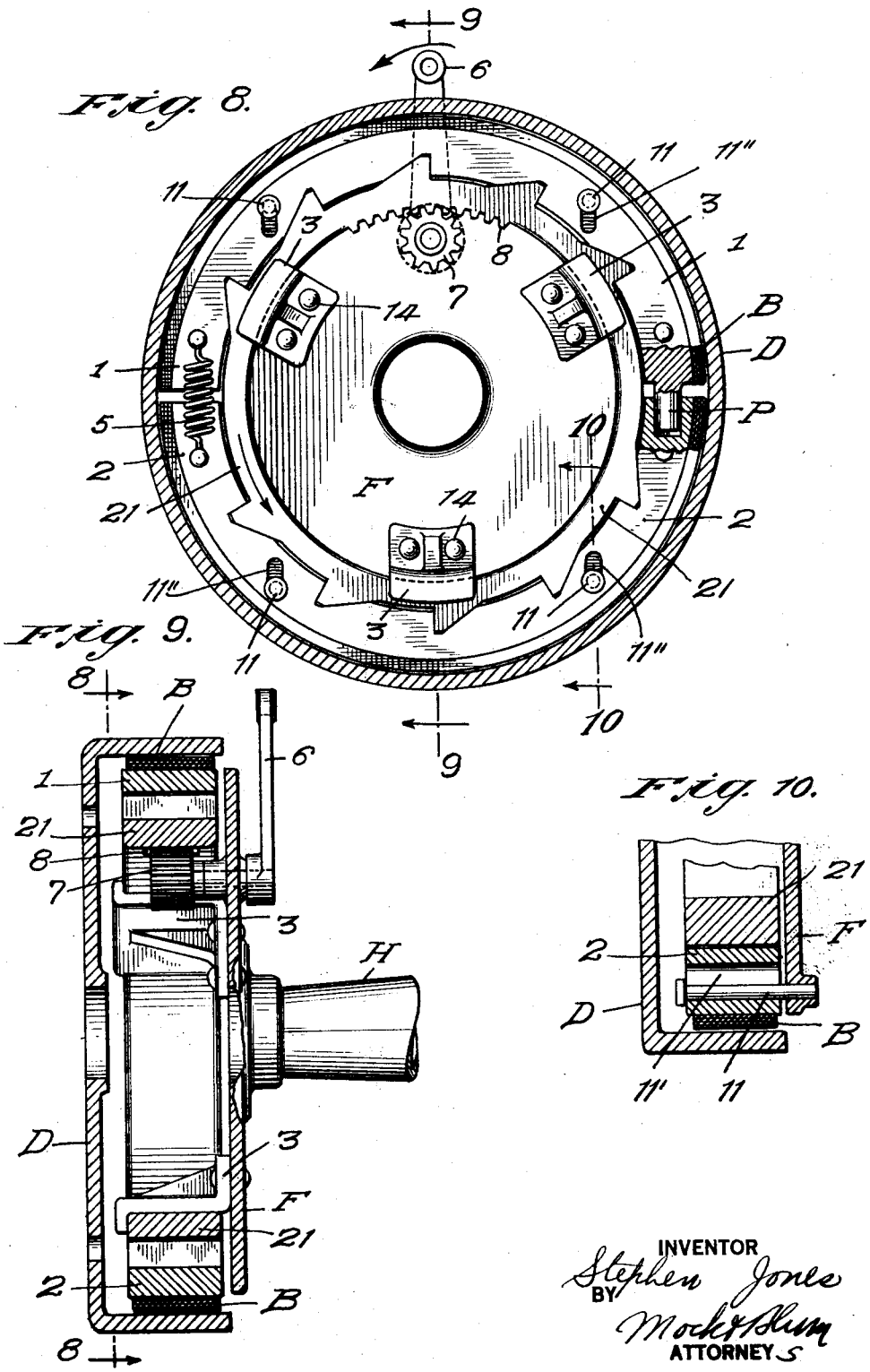

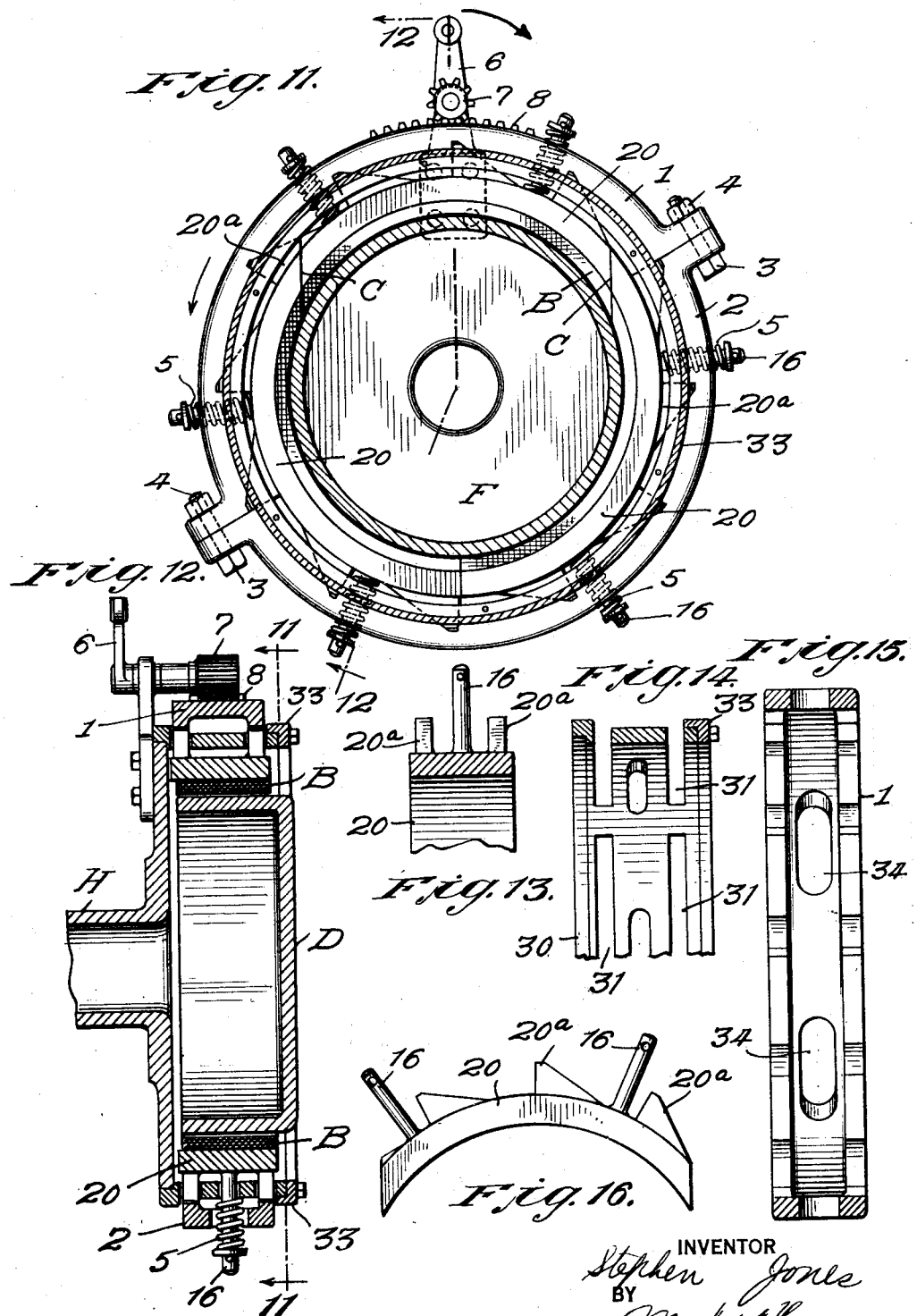

1,895,996

UNITED STATES PATENT OFFICE

STEPHEN JONES, OF LEONIA, NEW JERSEY

BRAKE DEVICE

Application filed April 4, 1928. Serial No. 267,192.

My invention relates to a new and improved brake for automobiles and other vehicles.

One of the objects of my invention is to provide a simple, efficient and durable braking device which shall be applicable to all kinds of brakes, either external or internal.

Another object of my invention is to provide a braking device in which the brake shoes will be uniformly and equally applied to the brake drum, so as to insure equal pressure, and uniform action and wear throughout.

Another object of my invention is to provide a braking device by means of which the brake shoe will be simultaneously actuated to the operative position throughout substantially the entire length thereof so that the action of the brakes will be more uniform and there will be no chattering when the brakes are suddenly and forcibly applied.

Another object of my invention is to provide a braking device in which the brake shoe is positively and uniformly cleared from the brake drum when the braking pressure is released.

Other objects of my invention will be set forth in the following description and drawings which illustrate preferred embodiments thereof, it being understood that the above general statement of the objects of my invention is intended to generally explain the same and not to limit it in any manner.

Fig. 1 is a side elevation partially in section illustrating one embodiment of my device.

Fig. 2 is a sectional view on the line 2—2 of Fig. 1.

Fig. 3 is a top view of one of the flanges of the brake shoe.

Fig. 4 is a sectional view on the line 4—4 of Fig. 1.

Fig. 5 is a side elevation partially in section illustrating a second embodiment of my device, this view being taken on the line 5—5 of Fig. 6.

Fig. 6 is a sectional view on the line 6—6 of Fig. 5.

Fig. 7 is a sectional view on the line 7—7 of Fig. 5.

Fig. 8 is a side elevation partially in section illustrating a third embodiment of my invention, this being a sectional view on the line 8—8 of Fig. 9.

Fig. 9 is a sectional view on the line 9—9 of Fig. 8.

Fig. 10 is a sectional view on the line 10—10 of Fig. 8.

Fig. 11 is a side elevation partially in section illustrating a fourth embodiment of my invention, this being a sectional view on the line 11—11 of Fig. 12.

Fig. 12 is a sectional view on the line 12—12 of Fig. 11.

Fig. 13 is a detail view showing a pin and the ratchet cams of a brake shoe section.

Fig. 14 is a detail view of the holding ring.

Fig. 15 is a sectional view of the outer rim or holding ring.

Fig. 16 is a detail view of the ratchet cams of the brake shoe.

In the embodiment shown in Figs. 1–4, the axle housing H is provided with a flange F suitably connected thereto. The housing H and the flange F are of the ordinary type which are now customarily provided upon automobiles, auto trucks, and the like. Four radial arms 12, one of which is shown in Fig. 2, have heads 14' which are connected to the flange F by means of rivets 14. For convenience, these four arms 12 may be considered as comprising two vertical arms and two horizontal arms, although the action of my device is independent of any particular position of these arms. The vertical arms 12 are provided with lateral projecting pins 11 and 11', which fit in slots 11'' and 11''' formed in the vertical arms 10 and 10' which are connected to the top and bottom brake shoes B. As shown in Fig. 2, for example, the vertical arms 10 and 10' of the brake shoes B are U-shaped so that the brake shoes B can move vertically but they are restrained from any lateral movement. These pins 11 and 11' may be provided with any suitable means such as heads for retaining the arms of the brake shoes slidably mounted thereon. Each of the brake shoes B, which is provided with any suitable brake lining, is provided at its outer face with a cam member 20 whose surface is divided into a suitable number of uniformly curved cams. The respective brake shoes B are forced against the brake drum D, when roller carriers 1 and 2 are turned in the direction of the arrows indicated in Fig. 1. These roller carriers 1 and 2 are connected by means of bolts 3 and nuts 4 so that they move in unison. Compression springs 5 are provided for providing a positive clearance between the brake shoes B and the drum D. These springs 5 operate to positively release the brake shoes B from the drum D, after the operating force upon the brake shoes B has been released. These compression springs 5 are mounted on rods 16 and 16' which project into openings 17 and 17' in the lateral ends of the brake shoes. Said rods 16 and 16' may be suitably secured to the adjacent arms 12. As shown in Fig. 3, the ends of the cam members 20 are provided with ears 20', which fit laterally upon the roller carriers 1 and 2 so that any lateral twisting with respect to the roller carriers 1 and 2 is prevented. The U-shaped roller carriers 1 and 2 are provided with rollers R which co-operate with the outer curved cam surfaces of the cam members 20 so that when the roller carriers 1 and 2 are turned in the direction of the arrows indicated in Fig. 1, each of the brake shoes B is positively forced against the drum D throughout the entire length thereof. That is, instead of having the pressure concentrated at a particular point or points of the brake shoes, the braking force is uniformly applied over the entire area of each brake shoe. The brake shoes B are not pivotally mounted, so that they are slidably movable to their operative position. This is much superior to prior types of brakes, in which the brake shoes were pivotally mounted on carriers so that said shoes were actuated by a turning movement. The roller carriers 1 and 2 are provided with gear teeth 8 for a portion of each of the inner peripheries thereof, and a pinion 7 which meshes with these gear teeth 8 is mounted in the adjacent arm 12 and is operated by a lever 6 which is suitably connected to the brake pedal or the like. When the lever 6 is turned in the direction of the arrows indicated in Fig. 1, the brake shoes B are simultaneously forced into the operative position. While I have mentioned that rollers R could be connected to the carriers 1 and 2, fixed cylindrical members could be utilized instead of rollers, and it is not necessary that the rollers or similar members should extend from one lateral face of the respective carrier to the other.

In the embodiment shown in Figs. 5–7 the parts and the operation thereof are substantially the same as before. However, in this embodiment the cam surfaces of the brake shoes are formed with ratchet-like cam teeth 21 and the outer actuating members are formed with similar internal cam teeth so that no rollers or the like are required. Thus, and as shown in Fig. 5, for example, the cam members 20 of the brake shoes are formed with ratchet cam teeth 9, and the outer members 1 and 2 of the device are formed with corresponding inner depressions. In the embodiment shown in Fig. 5, the brake drum is provided with arms B', which slidably abut the adjacent surfaces of the members 1 and 2, so that a slidable guide is provided at this point. Anti-friction rollers or any similar device may be provided for facilitating the sliding movement of the members 1 and 2. Likewise, and as clearly shown at the top of Fig. 5, an eye E could be provided at the connected tops of the members 1 and 2, by means of which said members 1 and 2 could be simultaneously turned in the clockwise direction, instead of using the lever 6 and the pinion 7 previously mentioned.

In the third embodiment shown in Figs. 8–10 an internal type of brake is illustrated. In this embodiment the brake shoes B are interior to the brake drum D. The clearance springs 5 are now of the tension type, one of these being shown at the left-hand side of Fig. 8. The outer members 1 and 2 are provided with internal ratchet-like depressions, as previously shown in Fig. 5 for example. Guide members 3 are connected to the flange F by means of rivets 14 so as to permit the turning movement of the inner cam ring 21, while preventing any lateral displacement thereof. As shown at the right-hand side of Fig. 8, the member 1 is provided with pins P at the ends thereof, and these pins P fit into suitable recesses provided at the ends of the member 2 so that the members 1 and 2 can move apart with respect to each other but without turning, when the inner ring 21 is actuated by means of the lever 6. Slots 11'' are provided in the members 1 and 2 and lateral projecting pins 11 are provided in the flange F, so that while the members 1 and 2 can move vertically away from each other, they are prevented from moving in any other direction. It is obvious that whenever I have illustrated ratchet cam teeth, that these could be replaced by roller cams or fixed cylindrical cam members as previously described in Fig. 1.

In the fourth embodiment shown in Figs. 11–16, a special housing for the axle is provided. As shown in Fig. 12, the housing H has an end flange. An annular housing member 30 having a periphery 33 having outer slots 31 formed therein is connected to the end flange of the housing. Said annular housing member may be welded to, or made integral with the end flange of housing H. The brake shoes B are provided with guide rods 16 which extend through the slots 31. While I have shown these rods 16 as integral with the shoes it is obvious that the arms 16 could be separable. In this embodiment three brake shoes B are provided each of which occupies approximately 120° of the circumference of the brake drum D. As shown in Fig. 16, each of the brake shoe sections is provided with a cam member 20, having ratchet-like cam teeth 20a and guide rods 16, which extend through the guide slots 31. As shown at the bottom of Fig. 12, the rods 16 are provided with springs 5, the inner ends of which bear against the housing 30 and the outer ends of which bear against washers held in position on the outer ends of the rods 16. Hence, the compression springs 5 operate to force the brake shoes B away from the drum D so as to provide a constant clearance. As shown in Fig. 16, one of the brake shoe sections is provided with two chamfered ends. The two other brake shoe sections each have a correspondingly chamfered end, the other end thereof being radial. Hence, when the parts are in the position shown in Fig. 16, the two bottom brake shoe sections can be readily placed in position, and the top brake shoe section can be readily placed between the ends of the first two brake sections and then moved upwardly to the position shown in Fig. 11, so that its rods 16 can be caused to project beyond the housing 30. As shown in Fig. 11, the cam teeth 20a of the cam members 20 of the brake shoes B, also extend beyond the housing 30 so that the ends of these cam teeth can be engaged by corresponding ratchet-like depressions of the members 1 and 2. As shown in Fig. 15 for example, the housings 30 are provided with slots 34 so that the rings 1 and 2 can turn without laterally moving off the housing. In this embodiment the outer rings 1 and 2 are connected to each other as before and the outer ring 1 is provided with external teeth 8 actuated by a gear 7.

I have shown preferred embodiments of my invention, but it is clear that numerous changes and omissions could be made without departing from the spirit of my invention.

I claim:—

1. In combination, a brake drum, a plurality of brake shoes operatively associated with the said drum and slidably movable with respect thereto, spring means associated with the said brake shoes and adapted to urge them to clear the said drum, the said brake shoes being provided with a plurality of cam surfaces, and a turnable actuating member having operating members respectively associated with the said cam surfaces, to urge the said brake shoes in a radial direction against the drum.

2. An internal brake comprising a brake drum, a plurality of brake shoes located within said brake drum, said brake shoes being slidably connected to each other, and operating means external to said brake shoes and adapted to move them towards and away from the operative position, said brake shoes being movable toward and away from said drum.

3. A braking device comprising a drum, a non-pivoted rigid brake shoe slidably mounted with respect to said drum, guide means adapted to guide said brake shoe so that it is slidably movable towards and away from said drum, and operating means independent of said guide means and adapted to operate upon a plurality of separated points of the brake shoe in order to urge the same radially towards the said drum, said operating means being quick-acting and being movable in a direction inclined to the direction of radial movement of said brake shoe.

4. A braking device comprising a drum, a non-pivoted rigid brake shoe slidably mounted with respect to said drum, guide means adapted to guide said brake shoe so that it is slidably movable towards and away from said drum, and operating means independent of said guide means and adapted to operate upon a plurality of separated points of the brake shoe in order to urge the same radially towards the said drum, and clearance means adapted to constantly urge the said brake shoe away from said drum, said operating means being quick-acting and being movable in a direction inclined to the direction of radial movement of said brake shoe.

5. A braking device comprising a drum, a non-pivoted rigid brake shoe slidably mounted with respect to said drum and having a plurality of cam surfaces formed on its outer periphery, guide means adapted to guide said brake shoe so that it is slidably movable towards and away from said drum in a radial direction with respect to said drum, and an operating device movable in a direction parallel to the periphery of said drum and adapted to cooperate with said cam surface to actuate said brake shoe.

In testimony whereof I affix my signature.

STEPHEN JONES.